Feb. 13, 1968         D. G. CARL ET AL         3,368,915
ABRASION-RESISTANT GLASS ARTICLE HAVING DUAL
PROTECTIVE COATINGS THEREON
Original Filed March 27, 1964
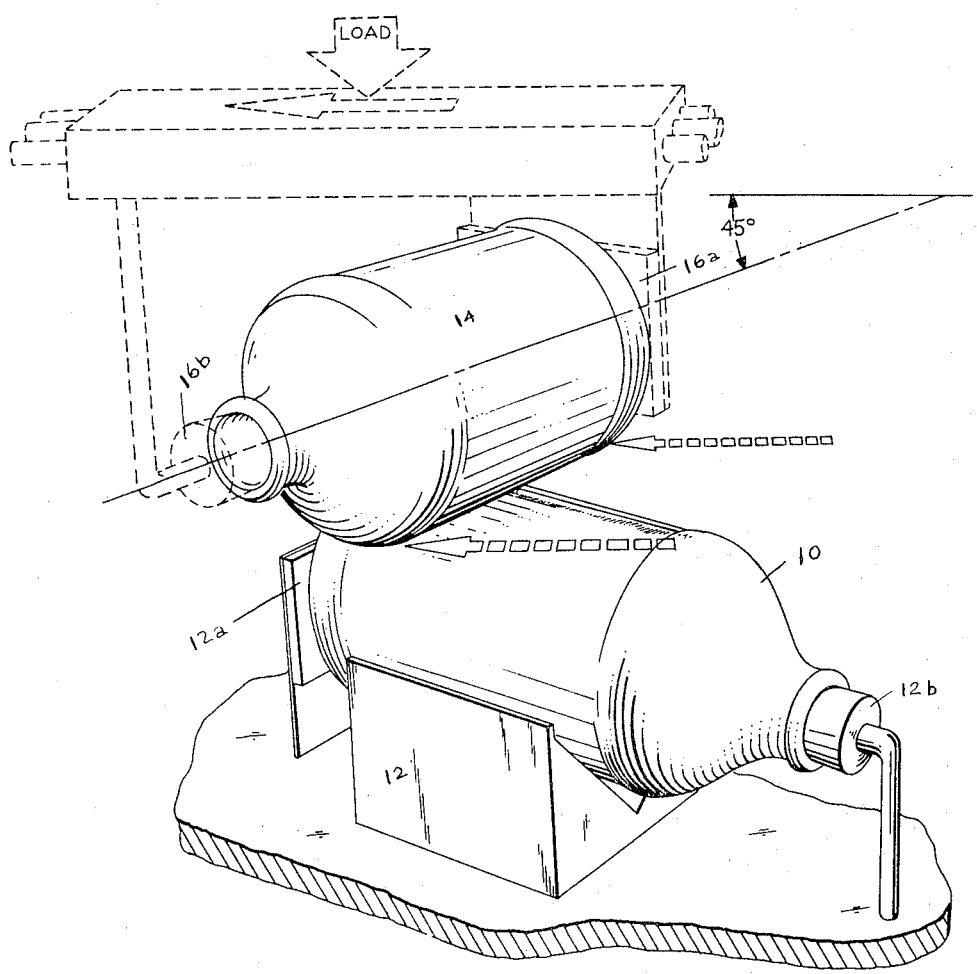
INVENTORS
DAVID G. CARL &
HERMAN A. STEIGELMAN
BY
J. P. Nelson and
W. A. Schmich
ATTORNEYS

United States Patent Office 3,368,915
Patented Feb. 13, 1968

3,368,915
ABRASION-RESISTANT GLASS ARTICLE HAVING
DUAL PROTECTIVE COATINGS THEREON
David G. Carl, 83 Woodland Drive, Bridgeton, N.J.
08302, and Herman A. Steigelman, 2884 Wiltshire
Drive, Lambertville, Mich. 48144
Original application Mar. 27, 1964, Ser. No. 355,252, now
Patent No. 3,323,889, dated June 6, 1967. Divided and
this application Sept. 21, 1966, Ser. No. 630,146
7 Claims. (Cl. 117—72)

This application is a division of copending application, Ser. No. 355,252, filed Mar. 27, 1964, now U.S. Patent 3,323,889.

The present invention relates to the treatment of glass surfaces which are subjected to abrasive contact with each other in the course of handling, filling, and packaging operations and, more particularly, to a method of treating such glass surfaces to improve their resistance to abrasion. This invention further relates to improved abrasion-resistant glass articles produced by the aforesaid method.

Glass derives its strength from an unblemished surface, and any scratches or flaws which are present on its surface considerably decrease its strength, down to as little as one-fourth of its original value. While glass articles such as jars, bottles, tumblers, and the like, have their maximum strength as soon as they are formed, this strength rapidly diminishes as the articles come into contact with each other and with other surfaces, as occurs during the handling, packaging, and shipping of the glassware. This problem is particularly acute in the food- and beverage-processing field wherein the glass containers are subjected to various processing cycles, whereby the bottles are successively filled, closed, and packaged for delivery. Many times the bottles are also subjected to washing, sterilizing, or vacuum treatments, depending upon the particular products with which they are filled.

During each of these operations, the bottles continuously come into contact with each other as they move from station to station and as they are handled by the various apparatus. Breakage of bottles during these operations, particularly after the bottles have been filled, presents additional problems to the processors and adds to the total cost of the operations. To minimize the resulting scratching and abrading of the glass surfaces during the aforesaid operations, numerous attempts have been made in the past to coat the exterior glass surfaces with lubricant compositions. While coating compositions have been used commercially and impart good scratch-resistant properties to glass containers, the properties imparted by some of these compositions are considerably reduced, if not lost altogether, when the treated glass surface is wetted either by water or steam, during the processing cycle. Glass containers for beer, for example, are subjected to a caustic wash prior to being filled, and the glass surfaces, being constantly jostled together as they successively move along the conveyors to the filling, capping, and packaging stations, become scratched and weakened due to the loss of the scratch-resistant properties originally imparted by the coating. Since the product is packaged under pressure, as are carbonated beverages, for example, it is extremely desirable that the surfaces of the containers have as few scratches or abrasions as possible when they ultimately reach the consumer.

It will be appreciated that if the bottles are coated with a composition having good wet and dry scratch-resistant or abrasion-resistant properties, more bottles can be handled by the filling and packaging apparatus in the same amount of time merely by spacing the bottles closer together and increasing the speed of the conveyors. Even though the bottles will be subjected to more contacts with adjoining bottles, the coating will afford sufficient protection so as not to weaken the glass bottles.

Accordingly, it is an object of this invention to provide a method for forming an abrasion-resistant coating on glass surfaces while avoiding the shortcomings of the methods and compositions known and used in the past in attempting to form such abrasion-resistant coatings.

Another object of this invention is to provide a thin, substantially transparent coating on a glass surface, which coating is highly resistant to abrasion, while simultaneously substantially maintaining the strength characteristics of the glass.

Still another object of this invention is to provide a method for coating a glass surface, such as the exterior of a glass container, so as to impart thereto improved dry and wet scratch-resisting properties, thus permitting the container to undergo normal handling, processing, and shipping, with the consequent rubbing of the glass surface with other surfaces, without materially decreasing the strength of the container.

A further object of this invention is to provide an article of manufacture having a glass surface and, on said surface having a tightly adhering, thin, substantially colorless and transparent coating which coating imparts superior wet and dry scratch-resisting and abrasion-resisting properties to the glass surface.

Still another object of this invention is to provide glassware having a tightly adhering, thin, substantially colorless and transparent coating on its surface, which coating imparts increased strength and resistance to the ware, enabling it to withstand greater internal pressures without breakage.

A further object of this invention is to provide glassware having a thin, substantially colorless and transparent coating on its surface which coating is insoluble in water or caustic solutions, is free from taste and odor, and is nontoxic, so as to permit the ware to be safely used for food and beverages.

In attaining the objects of this invention, one feature resides in treating a glass surface with a titanium-containing compound which is pyrolyzable, i.e., chemically decomposed by the action of heat, to form oxides of titanium on the glass surface while the surface is at a temperature above the pyrolyzing temperature of the compound, cooling the treated glass, such as in an annealing lehr, and applying to the cooled surface, while it is at a temperature within the range of about 150–450° F., a solution, dispersion, or emulsion of an olefin polymer which can tenaciously bond to the titanium oxide layer on the glass, and then drying the coated surface.

Another feature of the invention resides in applying to the cooled titanium oxide-coated surface, in admixture with an alkali metal salt of a fatty acid, an emulsifiable olefin polymer, such as polyethylene wax, polypropylene wax, or similar low molecular weight polymeric olefin waxes.

The above and other objects, features, and advantages of the present invention will become apparent to those skilled in the art upon a reading of the following description of the invention.

In carrying out the invention, the glass surface of an article of manufacture, such as a bottle, jar, tumbler, sheet glass, and the like, is first treated soon after the article leaves the glass-forming machine and as it is being conveyed to the annealing lehr. A solution of a titanium-containing compound is sprayed onto the exterior of the glass surface while the glass surface is at a temperature above the pyrolyzing temperature of the compound. The temperature of the shaped ware, as it leaves the glass-forming machine, is such that it is above the pyrolyzing temperature of the compounds. The range of temperatures necessary to pyrolyze the titanium-containing compounds is between about 700° and 1300° F., depending upon the particular compound used, with the preferred range being from about 900° to 1200° F.

The titanium-containing compound which is employed for the purpose of this invention is one which upon contact with the heated glass surface will react to form a substantially colorless, transparent layer or coating of titanium oxide, primarily $TiO_2$, which layer or coating tightly adheres to the surface of the glass and can have an average thickness of up to about 1 micron, but is preferably less than 1 micron.

Among the titanium-containing compounds suitable for purposes of this invention are volatile metallo-organic compounds such as the alkyl titanates, preferably where the alkyl group has from 1–8 carbon atoms, and including tetrabutyl titanate, tetraisopropyl titanate, tetra-ethylhexyl titanate, and the like. Also included among the suitable titanium-containing compounds are the titanium tetrahalides and particularly titanium tetrachloride.

As the glass articles, now coated with the thin, transparent titanium oxide layer, enter the annealing lehr and are progressively cooled over a period of time to about 400° F. and lower, they are sprayed with an organic coating composition, preferably an aqueous medium containing an olefin polymer and an alkali metal salt of a fatty acid, such as potassium oleate, potassium stearate, and the like. It is to be understood that when reference is made to alkali metal salts, the ammonium salt is to be included. It has been found that morpholinium stearate will also be satisfactory for the purposes of this invention in lieu of the salts of the fatty acid. When the second coating is dried, the resultant coated article has a scratch-resistance value which is unexpectedly and vastly superior to that of a glass surface having either coating alone.

Furthermore, when the aqueous medium of the second coating composition contains an olefin wax, for example, a low molecular weight polyethylene wax, the wet abrasion-resistance of the coated glass surface is dramatically improved, even after the coated surfaces have been subjected to caustic washes for a period of time.

When the second coating composition contains an alkali metal salt of a fatty acid and a polyethylene wax, in aqueous emulsion, it has been found that excellent results are obtained when this coating composition is that disclosed in U.S. Patent 2,995,533, assigned to the assignee of the present invention, which disclosure is incorporated herein by reference.

The preferred emulsion is prepared by melting 40 parts of partially oxidized low-molecular weight polyethylene having a molecular weight of approximately 1200–2000 and an acid number of 14 to 17, and adding thereto 11 parts of a fatty acid, such as oleic, palmitic, stearic, lauric, or mixtures thereof. Two parts of an aqueous solution of an alkali metal hydroxide are then added to the mixture while the mixture is at a temperature of from 230°–245° F. Water is also added in an amount of 207 parts. The polyethylene has a particle size of less than 10 microns, usually from 1 to 5 microns, and comprises a solids content of about 20% by weight of the emulsion. Additional details on how to make this emulsion are to be found in the specification of the aforesaid U.S. Patent 2,995,533. A preferred composition has the following proportions in approximate parts by weight:

| | Parts |
|---|---|
| AC polyethylene No. 629 | 40 |
| Oleic acid (U.S.P.) | 11 |
| Potassium hydroxide | 2 |
| Distilled water | 207 |

The aforesaid polyethylene is distributed by Allied Chemical and Dye Corporation. The above emulsion is then diluted with up to about 200 parts water by volume and sprayed directly onto the glass surface previously treated with a titanium compound which has been pyrolyzed to oxides of titanium, including $TiO_2$.

The following examples are merely illustrative of the present invention and should not be considered limiting its scope in any way.

*Example 1*

A tetrabutyl titanate solution consisting of one part by volume of titanate and two parts by volume of anhydrous n-butanol was prepared by dissolving the titanate ester at room temperature in the solvent. The solution thus obtained was sprayed, using compressed air, onto the exterior surface of glass bottles at the rate of 1 g.p.h. as they were continuously being conveyed from the bottle-forming machine to the annealing lehr. The temperature of the surface was about 1100° F. and the titanate was pyrolyzed almost immediately. A clear, transparent coating formed upon the surface of the bottles which was hard, but the bottles could, nevertheless, be scratched by firmly rubbing two containers against each other.

*Example 2*

A number of uncoated bottles similar to those used in Example 1 were coated by spraying at the rate of 1 g.p.h. with an aqueous emulsion containing 0.15% polyethylene wax (AC–629) and 0.05% potassium oleate. The temperature of the surfaces of the bottles was about 300° F. Rubbing two of the bottles hard against each other by hand resulted in scratches developing on both surfaces.

*Example 3*

A number of bottles were first treated by the process as defined in Example 1, and the coated bottles were then further treated in accordance with the process of Example 2 as their surfaces cooled to about 300° F. The combined thickness of the coatings was less than 1 micron. When two of the bottles were rubbed hard against each other, no scratches developed on either bottle. When two uncoated bottles are rubbed together, even lightly, scratching of the bottles readily occurs.

*Example 4*

Several bottles were coated in the manner of the process of Example 2 except that the aqueous emulsion consisted of 0.14% polyethylene, 0.06% morpholinium stearate and the remainder water.

*Example 5*

Additional bottles which were coated in the manner disclosed in Example 1 were then given a second coating of the emulsion of Example 4 in accordance with the process of that example.

*Example 6*

Several bottles which were first coated in the manner described in Example 1 were then coated with a 0.2% aqueous solution of potassium oleate in the same manner as described in Example 2.

Bottles treated in accordance with the foregoing examples were tested with the scratch test machine, illustrated in the drawing, to evaluate the effectiveness of the respective coatings. The machine is designed to abrade the surface of one glass bottle against the surface of a similar bottle. Thus, a bottle 10 is fastened securely in a stationary low set of chucks 12, 12a and 12b, while a second bottle 14 is fastened in a set of upper chucks 16a, 16b, which are positioned so that the axes of the bottles are at 90° relative to each other. A test load is applied to the upper bottle 14 while it is being driven (by means not shown) at a constant speed of 2.8 inches per minute in a direction 45° to the axis of each bottle. The actual rate of scratch propagation on the bottles is then 2 inches per minute.

Using the test apparatus of the drawing, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted.

The force exerted by the second bottle 14 is a known, measured force and, after each pass, the bottles are examined for scratches. The force, or load, in pounds was measured with respect to the scratch-resistance of the dry bottles; of bottles which were wetted with water, i.e., measured while the contacting surfaces in the above test machine were submerged in water; and bottles which had been first subjected to a caustic wash comprising a 5% NaOH aqueous solution at a temperature of 150° F. for a period of one-half hour. The results are set forth below and are compared with an uncoated bottle:

TABLE I

| Example | Number of Pounds to Produce Scratch | | | |
|---|---|---|---|---|
| | Dry | Wet | After Caustic Wash | |
| | | | Dry | Wet |
| Uncoated bottle | 2 | 3 | 2 | 5 |
| 1 | 2 | 2 | 7 | 4 |
| 2 | 20 | 9.5 | 15 | 15 |
| 3 | 90 | 70 | 90 | 90 |
| 4 | 20 | 15 | 9.5 | 9.5 |
| 5 | 95 | 85 | 90 | 85 |
| 6 | 95 | 80 | 35 | 25 |

From the above table, the unexpected and synergistic results obtained by the process of the present invention over the coatings of Example 1 and Example 2 are readily demonstrated, particularly with respect to the improved wet properties and especially the improved wet and dry properties of the bottles in and after the caustic wash. Since almost all food containers are subjected to a plurality of operations including washing, pasteurization, sterilization, caustic baths, and the like, the risk of scratching or abrading the bottles is particularly acute at such times, and it is precisely at such times that the coating of the present invention affords the most protection to the glass surfaces.

Coated bottles prepared in accordance with the processes defined in Examples 1, 2, and 3 were subjected to a hydrostatic test procedure to measure the effectiveness of the various coatings. Each bottle was filled with water and pressure was applied to the water until the bottle burst. 80 bottles were used in each test, and the average pressure in pounds per square inch needed to break the bottles was measured. All bottles, including uncoated ones, were abused for 1 minute by jostling them together so that there was a number of contacts between adjacent surfaces, and the bottles were measured for bursting pressure. The average bursting pressure for uncoated, unabused bottles removed from the annealing lehr was 279 p.s.i. The results were as follows:

TABLE II

| Samples: | Bursting pressure (p.s.i.) |
|---|---|
| Control | 185 |
| Example 1 | 165 |
| Example 2 | 175 |
| Example 3 | 279 |

There was no discernible loss in strength of bottles treated in accordance with the invention when compared with newly formed bottles which had no scratches thereon, even though the coated bottles of the present invention were abused for 1 minute. Bottles of the invention which were abused for ten minutes still had an average bursting strength of 240 pounds, thus attesting to the protection afforded by the coating of the present invention.

Additional tests were run with soda-lime flint glass bottles, and the scratch resistance of each bottle is compared with that of a control bottle in Table III infra. The following examples disclose the particular conditions to which the bottles were subjected prior to being tested on the scratch-resistance test machine.

*Example 7*

The glass bottles coming out of the glass-forming machine were deposited on the conveyor carrying them to the annealing lehr. While the bottles were at a temperature of about 1100° F. they were sprayed, by means of an AGA gun, with a solution of 1 part by volume tetra n-butyl titanate (TBT) in butanol at a rate of 1 gallon per hour (g.p.h.). Dry $N_2$ was used as the propellant. The bottles were then annealed and permitted to cool to room temperature prior to placing them on the scratch-resistance test machine.

*Example 8*

The glass bottles coming out of the glass-forming machine and having their surfaces at a temperature of about 1100° F. were sprayed with a 100% concentration of $TiCl_4$ at a rate of 0.25 g.p.h., utilizing an AGA gun. The bottles were annealed and then cooled to room temperature. The $TiCl_4$ was a 99.5% anhydrous material having a specific gravity of 1.726, a boiling point of 136.4° C. and a viscosity at 25° C. of 0.85 cps.

*Example 9*

A 0.2 volume percent aqueous emulsion of Example 2 was sprayed onto uncoated bottles with an AGA traverse gun at the rate of .5 g.p.h. while the bottles were being annealed and the surfaces thereof were at a temperature of from 200–300° F.

*Example 10*

Titanium coated bottles prepared in accordance with the process of Example 7 were then coated with the 0.2% polyethylene-potassium oleate emulsion of Example 2 in accordance with the process described in Example 9.

*Example 11*

Bottles were prepared as in Example 10 except that the concentration of the tetra n-alkyl titanate in the n-butanol was 1:3 parts by volume.

*Example 12*

Bottles were prepared as in Example 10 except that the concentration of the tetra n-alkyl titanate in the n-butanol was 1:4 parts by volume.

*Example 13*

The newly formed glass bottles having a surface temperature of about 1100° F. were sprayed at a rate of 0.5 g.p.h. with a solution of 33⅓% by volume tetra isopropyl titanate (TPT) in 66⅔% by volume isopropyl alcohol using dry $N_2$ as the propellant. As the coated bottles passed through the annealing oven and were at a temperature of 200–300° F., they were further coated with a .2% aqueous emulsion of the polyethylene-potassium oleate composition of Example 2, above.

*Example 14*

Newly formed glass bottles were first coated with $TiCl_4$ in the manner described in Example 8 and then further coated as described with the 0.2% aqueous emulsion of Example 9 following the same procedures described therein.

*Example 15*

Uncoated bottles were coated in the manner described in Example 9, except that the 0.2% emulsion included potassium stearate in place of the potassium oleate.

*Example 16*

Newly formed glass bottles were sprayed with tetra n-butyl titanate as described in Example 7 and then further coated with the composition of Example 15 following the steps disclosed in Example 15.

Example 17

Uncoated bottles were sprayed, using an MBC gun, with a 0.1% by volume concentration of non-oxidized polyethylene having a molecular weight of 2000 (AC-6) in 99.9% m-xylene while the temperature of the bottles surfaces was 150–165° F.

Example 18

Newly formed glass bottles were sprayed with tetra n-butyl titanate as described in Example 7 but at a rate of 0.5 g.p.h. and then, as the temperature of the bottles was within the range of 150–170° F., they were further sprayed with the polyethylene composition of Example 17.

The scratch-resistance values of the bottles prepared in the manner described in Examples 7–18, inclusive, are set forth in the following table.

TABLE III

| Ex. | Coating | Scratch Data in Pounds, Machine Test | | | |
|---|---|---|---|---|---|
| | | Dry | Wet | After Caustic Wash Dry | Wet |
| 7 | TBT | 28 | 3 | 7 | 4 |
| 8 | TiCl₄ | 10 | | | |
| 9 | 0.2% Emulsion of Example 2 | 20 | 10 | 15 | 15 |
| 10 | TBT+Emulsion of Example 9 | 100 | 100 | 100 | 100 |
| 11 | ---do--- | 100 | 100 | 100 | 100 |
| 12 | ---do--- | 60 | 70 | 35 | 35 |
| 13 | TPT+Emulsion of Example 9 | 100 | 100 | 100 | 100 |
| 14 | TiCl₄+Emulsion of Example 9 | 100 | 100 | 100 | 100 |
| 15 | Emulsion of Ex. 2 with K stearate instead of K oleate | 20 | 15 | 9.5 | 9.5 |
| 16 | TBT+Emulsion of Example 15 | 95 | 85 | 90 | 85 |
| 17 | Polyethylene (AC-6) | 15 | 10 | 5 | 10 |
| 18 | TBT+Polyethylene of Example 17 | 91 | 95 | 95 | 95 |
| | Uncoated Bottle | 2 | 2 | 2 | 3 |

For purposes of this invention, it has been found that excellent results are obtained when the amount of titanium ester, such as tetrabutyl titanate, in the solvent, n-butanol, is about 1 part ester per two parts solvent, although up to 6 parts of solvent may be used per each part of ester. However, the scratch-resistance properties imparted to the glass are reduced when the ratio of titanate to solvent exceeds 1:3, as evidenced by the results of Example 12 in Table III. When tetra isopropyl titanate is used for the hot-end coating, best results are obtained when the ratio of titanate to solvent is up to 1:2.5 parts isopropyl alcohol. When the alcohol solvent is present in larger amounts, the scratch-resistance properties imparted to the glass surface are reduced. While the titanates can be applied in 100% concentrations and good results are obtained, it is preferred to dissolve the titanate in a suitable solvent so as to facilitate the spraying thereof. One skilled in the art would merely have to make the necessary adjustments in the spraying apparatus to insure that a sufficient amount of ester was pyrolyzed to form the tightly adhering, substantially colorless and transparent titanium oxide coating on the glass surface.

Various olefin polymers may be used as the second coating applied to the titanium oxide coated glass surface, including polymers of the lower alkenes such as ethylene, propylene, butylene, and the like. These polymers may be in solution in a suitable solvent or, preferably, are emulsified in an aqueous medium containing a suitable emulsifying agent therefor. Of the olefin polymers, polyethylene is the one which is preferred, and particularly low molecular weight polyethylene having an average molecular weight of about 1500–5000, and preferably 1500–2000. AC-6 polyethylene, used in Examples 17 and 18, has an average mlecular weight of 2000, a melting point of 219–226° F. (as measured by ASTM E 28–51T), a hardness of 3–5 (as measured by ASTM D 1321–55T), a specific gravity of 0.92, and an average viscosity at 140° C. of 180 centipoises. AC-629 polyethylene used in many of the foregoing examples has a melting point of 213–221° F., a hardness of 3–6, a specific gravity of 0.93, and a viscosity at 140° C. of 0.93 centipoise. Other suitable polyethylenes and olefin polymers will be suggested to those skilled in the art from the teaching of this invention, and it is intended to include all such suitable olefin polymers within the scope of this invention.

As is evident from the above examples, when using the preferred embodiment of the invention, the amount of alkali metal salt of a fatty acid, such as palmitic, stearic, lauric, oleic, or mixtures thereof, or morpholinium stearate, which is necessary as the emulsifying agent for the polyethylene in the second coating composition, is quite small. While from about 0.02 to about 0.5% of the salt may be present in the mixture, one skilled in the art may use more or less than this amount and still get the desired results of the invention. Likewise, the amount of the low molecular weight waxes used in the examples is quite small and can be from about 0.1 to about 0.6%, although again these ranges are not to be considered limiting the scope of the invention.

While the polymers, such as polyethylene wax, and the like, may be added as a third coating to the glass surface which has been treated with the titanium-containing compound and the salt of the fatty acid, it is preferable and more economical to incorporate these polymers in the second coating composition, as demonstrated in Examples 3, 5, and 6 above. Since the caustic bath apparently affects the coating wherein potassium oleate alone is applied to the TiO₂ and reduces its wet and dry scratch-resisting properties (see Table I, Example 6), bottles which are to be subjected to such a washing during the processing by a brewery, for example, should either have a polyethylene coating applied in addition to the two previous coatings, or the polyethylene may be mixed in with the second coating composition as shown in Example 3.

It has been found further that a bottle treated in accordance with the process of Example 1, and sprayed with a 0.25% solution of a low molecular weight oxidized polyethylene wax (AC Polyethlen 629) in meta-xylene at a temperature of from 45–100° C., preferably at about 60° C., and then dried, has a dry scratch-resistance of 85 lbs. and a wet scratch-resistance of 80 lbs.

As is evident from Example 18, Table III, unoxidized polyethylene may also be sprayed onto a glass surface previously coated with titanium oxide by pyrolysis of a titanium-containing compound, and excellent scratch-resistant properties are imparted to the glass surface.

From the foregoing description of the invention it is seen that excellent damage-preventive coatings are imparted to glass articles, such as glass containers, by first applying thereto a titanium-containing compound capable of being pyrolyzed to form oxides of titanium which will tenaciously adhere to the glass surface. The application is made while the glass surface is at a temperature above the pyrolyzing temperature of the titanium-containing compound and preferably within a matter of seconds after the ware has left the glass-forming machine. After the titanium oxide coating has been formed and as the ware is being cooled in the annealing lehr, a second coating containing an olefin polymer is sprayed onto the first coating. This second coating, in the preferred embodiment of the invention, is an aqueous emulsion of a mixture of a partially oxidized low molecular weight polyethylene wax and an emulsifying agent therefor, preferably an alkali metal salt of a fatty acid, such as potassium oleate.

Scratch-resistant glass bottles, coated in accordance with the present invention, were subjected to immersion in 190 proof ethanol for forty hours at room temperature. Infrared analysis of the ethanol showed no portion of the coating was dissolved.

From electron photomicrographs taken of glass surfaces coated with tetra n-butyl titanate and with the potassium oleate polyethylene emulsion of Example 2, the total coating thickness is estimated at from about 200 to 2000 A. The TBT layer (actually the oxides of titanium formed by pyrolysis) appears as a surface coating having a thickness of from about 60 to 1100 A., with an average thickness of about 150 to 350 A.

By electron diffraction, the TBT layer of a glass coated with TBT and the aforesaid emulsion of Example 2 shows about a 90% crystalline material present, while the TBT layer of a glass coated only with TBT shows only about 20% crystalline material. The diffraction pattern of the latter layer indicates the presence of $Ti+SiO_2$;

$$TiO+SiO_2$$

$TiO$, $Ti_2O_3$, $TiO_2$ (rutile); $SiO_2$ (beta-cristobalite) and $TiO+SiO_2$ (beta-cristobalite).

In glasses coated with the potassium oleate in polyethylene wax, per se, and with a TBT layer plus the oleate-wax mixture, electron photomicrographs reveal that the oleate-wax mixture on both glasses have about the same types and degree of local molecular aggregation or orientation. Observation of ring sections of glass and glass plus TBT samples in polarized light shows no surface stress. However, samples of glass plus the oleate-wax mixture and of glass plus TBT layer+oleate-wax layer seemed to show stress. Behavioral differences in these latter samples have also been noted. Peeling the oleate-polyethylene wax layer from the glass surface caused adhesional rupture at the glass-organic interface. Peeling the oleate-polyethylene wax layer from the glass plus TBT plus oleate-wax layer caused cohesional failure of the organic layer above the glass-organic interface. Furthermore, treatment of glass+oleate-polyethylene wax samples with boiling xylene for one hour essentially completely removes the organic layer. The same treatment for a glass plus TBT plus oleate-wax samples results in only partial removal of the organic layer.

While the invention has been discussed in terms of pyrolyzing a titanium-containing compound onto a heated glass surface to form a titanium oxide coating, it is to be understood that zirconium-containing compounds also may be pyrolyzed onto the heated glass surface to form a zirconium oxide first coating. The polyethylene solution, dispersion, or emulsion may then be sprayed onto this coated glass surface while the surface is at a temperature of from about 50 to 450° F. and preferably from about 200–300° F. to form a thin, less than 1 micron, transparent and substantially colorless scratch-resistant coating on the glass surface. Among the preferred zirconium-containing compounds are the alkyl zirconates, particularly those having up to about 8 carbon atoms in the alkyl group, and the zirconium tetrahalides.

Applicants have no satisfactory explanation as to why the coatings produced in accordance with the invention give such unexpected results, particularly when other organic compounds, including ethyl silicate, methyl borate, butyl borate, isopropyl borate, trimethoxyboroxine, colloidal aluminum hydroxide, colloidal silica, and the like, when sprayed onto the hot surfaces of the bottles in the same manner as the titanium compounds, failed to give any satisfactory scratch-resistance or abrasion-resistance properties to the treated glass surfaces. Even when the surfaces coated with these compounds were further coated with the composition and the method described in Example 2, above, the dry and wet properties, when measured, were unsatisfactory, and were particularly unsatisfactory when measured after the caustic wash treatment.

We claim:

1. An article of manufacture having a glass surface said surface having a thin, transparent, substantially colorless two-layer combination coating thereon which improves the abrasion-resistance properties of said glass surface, said coating comprising immediately adjacent the glass surface a first layer of a member selected from the group consisting of titanium oxide and zirconium oxide and as the second layer, a low molecular weight olefin polymer bonded to said first layer, said two-layer combination coating being substantially insoluble in water and caustic solutions.

2. An article as defined in claim 1 wherein first layer is formed by pyrolysis and the two-layer combination coating is less than 1 micron in thickness.

3. An article of claim 1 wherein said first layer is titanium oxide.

4. An article as defined in claim 1 wherein said olefin polymer is a polymer of a lower alkene.

5. An article as defined in claim 1 wherein said olefin polymer is polyethylene.

6. An article as defined in claim 1 wherein said olefin polymer is polyethylene and the thickness of the two-layer combination coating ranges from about 200 angstroms to about 2,000 angstroms.

7. An article of manufacture having a glass surface said surface having a tightly adherent coating thereon which imparts excellent abrasion-resistance properties to said glass surface, said coating having a thickness of less than 1 micron, said coating consisting of a first layer of titanium oxide pyrolyzed onto said glass surface and a second layer of a mixture of a low molecular weight polyethylene and an alkali metal salt of a fatty acid in intimate contact with said first layer, the bond between said titanium oxide layer and said polyethylene layer being such that removal of said polyethylene layer, as by abrading, occurs at a point above the interface of the oxide and polyethylene coatings.

References Cited

UNITED STATES PATENTS

| | | | |
|---|---|---|---|
| 2,965,596 | 12/1960 | Sharf | 117—124 X |
| 2,995,533 | 8/1961 | Parmer et al. | 260—23 |
| 3,161,534 | 12/1964 | Dettre | 117—69 |
| 3,161,536 | 12/1964 | Dettre et al. | 117—69 |

WILLIAM D. MARTIN, *Primary Examiner.*

R. HUSACK, *Assistant Examiner.*

UNITED STATES PATENT OFFICE
CERTIFICATE OF CORRECTION

Patent No. 3,368,915                                February 13, 1968

David G. Carl et al.

It is hereby certified that error appears in the above numbered patent requiring correction and that the said Letters Patent should read as corrected below.

In the heading to the printed specification, lines 4 to 6, for "David G. Carl, 83 Woodland Drive, Bridgeton, N. J 08302, and Herman A. Steigelman, 2884 Wiltshire Drive, Lambertville, Mich. 48144" read -- David G. Carl Bridgeton, N. J., and Herman A. Steigelman, Lambertville, Mich., assignors to Owens-Illinois, Inc., a corporation of Ohio --.

Signed and sealed this 6th day of May 1969.

(SEAL)
Attest:

Edward M. Fletcher, Jr.
Attesting Officer

Commissioner of Patents